United States Patent [19]

Pangborn et al.

[11] 3,998,942
[45] Dec. 21, 1976

[54] PROCESS FOR PRODUCING HYDROGEN AND OXYGEN FROM WATER

[75] Inventors: Jon B. Pangborn, Lisle; John C. Sharer, Evanston; Robert H. Elkins, Hinsdale, all of Ill.

[73] Assignee: American Gas Association a non-stock, non-profit corporation, Arlington, Va.

[22] Filed: Dec. 23, 1974

[21] Appl. No.: 536,014

Related U.S. Application Data

[63] Continuation-in-part of Ser. No. 390,178, Aug. 20, 1973, Pat. No. 3,939,257.

[52] U.S. Cl. .............................. 423/658; 423/481; 423/493; 423/500; 423/503; 423/579; 423/632; 423/657

[51] Int. Cl.² ...................... C01B 1/02; C01B 1/05; C01B 7/08; C01B 13/00

[58] Field of Search .......... 423/657, 658, 632, 579, 423/500, 503

[56] References Cited

UNITED STATES PATENTS 3,842,164  10/1974  Wentorf, Jr. ..................... 423/579

3,939,257  2/1976  Pangborn et al. ................. 423/658

OTHER PUBLICATIONS

C & EN, Sept. 3, 1973, pp. 32 and 33.
C. A. Jacobson's "Encyclopedia of Chemical Reactions," vol. 2, 1948, p. 683. Reinhold Pub. Corp., N.Y.

*Primary Examiner*—Edward Stern
*Attorney, Agent, or Firm*—Thomas W. Speckman

[57] ABSTRACT

A process for the production of hydrogen and oxygen from water comprising the steps of forming ferric chloride from ferriferrous oxide by reaction with a chloride ion yielding substance, reducing the ferric chloride produced with a reducing agent to produce ferrous chloride, thermally reducing the ferric chloride to produce ferrous chloride, then oxidizing either the ferrous compound or metallic iron with water so as to produce hydrogen. The metallic iron may be formed by reducing the ferrous compound with hydrogen. Four specific reactant regenerative closed cycle systems are disclosed utilizing the process of this invention for the production of hydrogen with high energy efficiencies.

12 Claims, 11 Drawing Figures

FIG. 3
PROCESS IX

FIG. 4
PROCESS X

Fig. 5 PROCESS XI

Fig. 6 PROCESS XII

PROCESS FOR PRODUCING HYDROGEN AND OXYGEN FROM WATER

CROSS-REFERENCE TO RELATED APPLICATION

This application is a continuation-in-part of pending application Ser. No. 390,178, filed Aug. 20, 1973, now U.S. Pat. No. 3,939,257 issued Feb. 17, 1976.

This invention relates to chemical processes for the production of hydrogen from water. These processes provide a closed cycle reactant regenerative process for the production of hydrogen from water requiring input of water and heat with removal of hydrogen and oxygen.

Thermochemical cycles to produce hydrogen have been sought in recent years to provide hydrogen for use both as a fuel and as a chemical reactant. Especially in view of ecological and pollution considerations, the use of hydrogen as a fuel has attained greater significance. Hydrogen may be produced from water, a cheap and abundant raw material, and when burned reverts to water, a non-polluting chemical. Hydrogen may be readily stored and transported. Hydrogen also affords extreme flexibility in its utilization as a fuel providing advantages in many ways over present fuels for power sources such as turbines, reciprocating engines and fuel cells.

The present commercial method for the production of hydrogen is the electrolysis of water into its constituent elements of hydrogen and oxygen. The electrolysis process is dependent upon electricity, and therefore its economics are dependent upon generating electrical energy which is inefficient and expensive.

Direct thermal decomposition of water is not promising since water starts breaking with a reasonable yield at temperatures of 2500° to 3000° C. These temperatures are not attainable from heat sources such as nuclear reactors. Therefore, chemical cycles for production of hydrogen from water at temperatures attainable from the heat output of nuclear reactors would be desirable. The greatly expanded use of nuclear reactors, it would be advantageous to utilize the heat given off by the reactor to produce hydrogen and oxygen from the water molecule providing a new fuel. High temperature gas reactors have heat output temperatures in the order of 500° to 800° C in the coolant discharge. This heat output represents about 80 percent of the product energy from the nuclear reactor. Recent trends have been toward increases in such heat output temperature and such temperatures in the order of 1000° to 1200° C. can be expected as a development of present technology. Direct thermochemical process, utilizing such heat energy, have been sought in recent years.

Various thermochemical cycles for the production of hydrogen from water and the desirability of such production have been reviewed by C. Marchetti in "Hydrogen and Energy," Chemical Economy & Engineering Review, Jan. 1973, (Vol. 5, N.1).

A four step chemical cycle has been described by G. De Beni in French Pat. No. 2,035,558, Feb. 17, 1970, working with compounds of mercury, bromine and calcium. This process is described as the Mark-1 cycle by Marchetti. The Mark-1 process has disadvantages in requiring the use of highly corrosive chemicals at pressures of in excess of 20 atmospheres, and the use of mercury with its inherent pollution problems. Marchetti has calculated efficiencies in the order of 55 percent, but actual process problems have not been solved.

Vanadium and chlorine cycles, designated as Mark-3 by Marchetti, have been proposed, J. E. Funk "Thermodynamics of Multi-Step Water Decomposition Processes" ACS Symposium on Non-Fossil Fuels, Volume 16, No. 4, American Chemical Society, 1972, but favorable conditions for reaction have not been found and energy efficiencies are very low.

A process utilizing cesium metal is described in U.S. Pat. No. 3,490,871, Jan. 20, 1970. While no experimental work is reported in the patent, it appears the process requires temperatures of at least 1200° C. and presents difficult separations.

A process has been patented by De Beni, Luxemburg Pat. No. 60,372, Feb. 18, 1970, requiring the reduction of $Fe_2O_3$ to $Fe_3O_4$ at about 1400° C., an impractically high temperature from the standpoint of present technology of nuclear heat sources.

A process has been suggested by B. M. Abraham Science, Vol. 180, June 1, 1973, pgs. 959–960, using lithium nitrite and iodine. It is recognized that no confirming work has been done.

A process has been proposed by C. Hardy, designated as Mark-7 cycle by Marchetti, wherein hydrogen chloride formed in the reaction is transformed into iron chloride which reacts with water to produce hydrogen. We have experimented with similar cycles, but have not been able to successfully regenerate ferrous chloride by reduction of ferric chloride following the described reactions by Hardy, but have successfully reduced ferric chloride to ferrous chloride by the processes described in this application.

Processes have been suggested in General Electric Company Corporate Research and Development Report No. 73 CRD 222, General Electric Company, Schenectady, N.Y., July 1973, "Thermochemical Hydrogen Generation" by R. H. Wentorf, Jr. and R. E. Hanneman. These processes utilize in one instance, iron, chlorine and magnesium, and in another instance, iodine. These processes have not been proven even on laboratory scale and some of the necessary reaction steps require large energy inputs resulting in overall low efficiency. U.S. Pat. No. 3,821,358, June 28, 1974, Closed-Cycle Thermochemical Production of Hydrogen and Oxygen, Leonard V. Interrante and Robert H. Wentorf, Jr., relates to an iron, chlorine and magnesium cycle disclosed in the above report. The cycle disclosed in the patent has the same disadvantages as pointed out above.

It is an object of this invention to provide processes for producing hydrogen from water wherein ferriferrous oxide and a chloride ion yielding substance is reacted to produce ferric chloride which is directly reduced with heat to produce ferrous chloride and producing hydrogen from the ferrous compound or iron and water. One embodiment of this invention involves further reducing the ferrous compound with hydrogen to metallic iron and then oxidizing the metallic iron with water to produce hydrogen.

It is a further object of this invention to provide processes for the production of hydrogen from water in which the reactants other than water are regenerated and the reaction may be conducted in a closed cycle.

It is another object of this invention to provide processes wherein the reaction products are easily separable.

It is another object of this invention to provide processes for the production of hydrogen from water wherein the thermal output of nuclear reactors may be utilized to provide necessary heat.

It is still a further object of this invention to provide processes having high energy efficiency for the production of hydrogen from water.

It is another object of this invention to provide processes for production of hydrogen and oxygen from water wherein the hydrogen is produced in a different reaction site than the oxygen.

It is another object of this invention to provide processes for the production of hydrogen from water wherein the transfer of materials from one reaction site to another takes place in the gaseous phase.

It is still another object of this invention to provide a reactant regenerative closed cycle process for the production of hydrogen and oxygen from water wherein ferric chloride is directly reduced with heat to form ferrous chloride.

These and other objects, advantages and features of this invention will be apparent from the description together with the drawings, wherein.

This invention provides a process for the production of hydrogen from water comprising the steps of forming ferric chloride from ferriferrous oxide by reaction with a chloride ion yielding substance; reducing the ferric chloride produced directly with heat to produce ferrous chloride; and producing hydrogen from the ferrous compound or iron and water. One embodiment of this invention involves further reducing the ferrous compound with hydrogen to metallic iron and then oxidizing the metallic iron with water to produce hydrogen.

The basic process may be described by the following series of chemical equations. When hydrogen chloride is used as the chloride ion yielding substance the reaction may be expressed by the Equation $$Fe_3O_4 + 8HCl \rightarrow 2FeCl_3 + FeCl_2 + 4H_2O \quad \text{I-2, IX-2 and XI-2}$$

The reaction of ferriferrous oxide with hydrogen chloride proceeds will at temperatures of about 125° to 300° C. When chlorine is used as the chloride yielding substance the reaction may be expressed by the Equation $$Fe_3O_4 + 9/2Cl_2 \rightarrow 3FeCl_3 + 2O_2 \quad \text{II-2, X-2 and XII-2}$$

The reaction proceeds well with chlorine at about 800° to 1000° C.

The ferric chloride produced by the reactions shown by the above equations may be directly reduced to ferrous chloride with heat according to the Equation $$2FeCl_3 \rightarrow 2FeCl_2 + Cl_2 \quad \text{IX-3 and XI-3}$$

when hydrogen chloride is used, and the Equation $$3FeCl_3 \rightarrow 3FeCl_2 + 3/2Cl_2 \quad \text{X-3 and XII-3}$$

when chlorine is used. These reactions proceed well at about 250° to 350° C. as long as appreciable quantities of ferric chloride remain in the solid form.

Our parent application, Ser. No. 390,178, now U.S. Pat. No. 3,939,257. teaches that the ferric chloride reduction to ferrous chloride may be achieved in the presence of reducing agents such as cuprous chloride, chromous chloride and platinum. It is an object of this invention to eliminate the necessity for such reducing agents and the required regeneration of the reducing agent.

Our parent application, Ser. No. 390,178, now U.S. Pat. No. 3,939,257, teaches that the hydrogen producing step is the oxidation of ferrous chloride with water (steam) according to the Equation $$3FeCl_2 + 4H_2O \rightarrow Fe_3O_4 + 6HCl + H_2 \quad \text{I-1, IX-1 and X-1}$$

with hydrogen chloride or chlorine is used.

Throughout this description and claims the term "water" is used recognizing that under appropriate process conditions of temperature and pressure, the water will be in its vapor form. Thus, the term "water" refers to both liquid and vapor phases.

The hydrogen producing step may also be the oxidation of metallic iron with water. The ferrous compound may be reduced to metallic iron using hydrogen according to the Equation $$3FeCl_2 + 3H_2 \rightarrow 3Fe + 6HCl \qquad \text{XI-4 and XII-4}$$

when either hydrogen chloride or chlorine is used. This reaction proceeds well at about 600° to 1500° C. The metallic iron that is formed is then oxidized with water according to the Equation $$3Fe + 4H_2O \rightarrow Fe_3O_4 + 4H_2 \qquad \text{XI-1 and XII-1}$$

This reaction proceeds well at about 700° to 1500° C.

Thus, the hydrogen producing step is the oxidation of material selected from the group consisting of ferrous compound with water so as to produce hydrogen.

Figure 1:
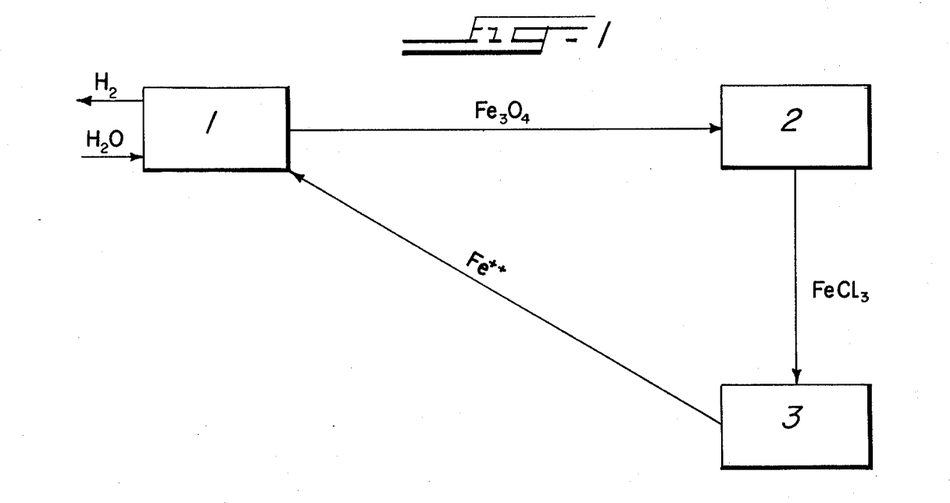
FIG. 1 is a generalized schematic flow diagram of a process for the production of hydrogen according to this invention wherein the ferrous compound is used in the hydrogen producing step.
Figure 2:
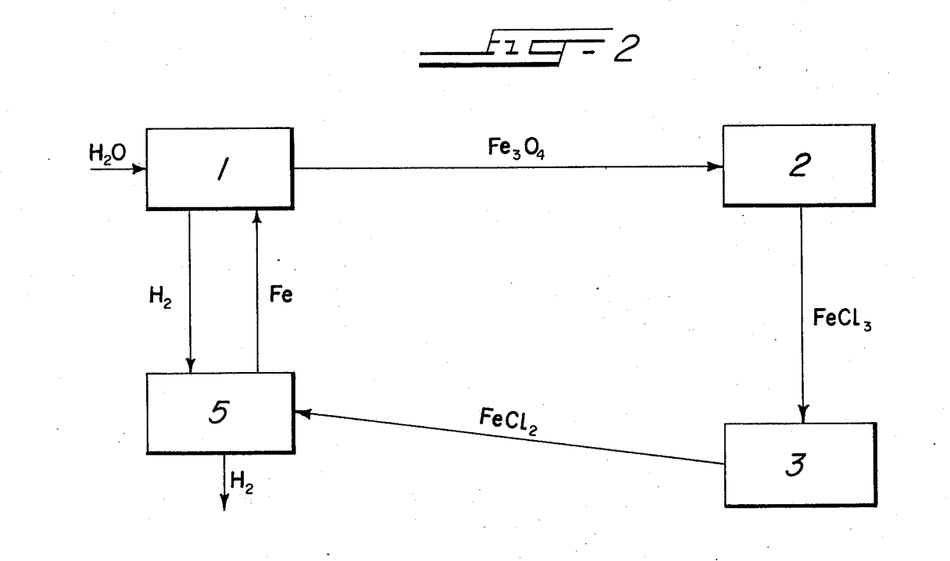
FIG. 2 is a generalized schematic flow diagram of a process for the production of hydrogen according to this invention wherein the metallic iron is used for the hydrogen producing step.

Combinations of above reactions, utilized in this invention, are schematically shown in the flow diagrams of FIG. 1 and FIG. 2. FIG. 1 schematically shows the generic invention not specifying the manner of reduction of ferric chloride. The generic invention shown in FIG. 1 is described in pending application Ser. No 390,178, now U.S. Pat. No. 3,939,257. The application Ser. No. 390,178, now U.S. Pat. No. 3,939,257 teaches reduction of the ferric chloride with a reducing agent while this application discloses the direction reduction of ferric chloride with heat to produce ferrous chloride.

FIG. 2 shows the major basic portion of a reactant regenerative closed cycle process of this invention for the production of hydrogen from water wherein solid ferriferrous oxide and gaseous chloride ion yielding substances are provided to a reaction zone for reaction to produce ferric chloride. The ferric chloride is thermally reduced to ferrous chloride. The ferrous chloride is further reduced with hydrogen to produce metallic iron. The metallic iron is then oxidized with steam to produce hydrogen for reduction of the ferrous chloride and removal from the cycle and ferriferrous oxide for recycle. The other steps of the following described specific closed cycle process are for reactant regeneration. The flow diagrams of these figures are not chemically balanced, but are presented to show in a simplified manner the overall cycles of reactions discussed above. Further description of the above reactions is set forth in the description to follow setting forth preferred embodiments of this invention in a reactant regenerative closed cycle.

The ferrous compound produced by the reactions of Equations IX-3, X-3, XI-3 and XII-3, may be exchanged to result in another desired ferrous compound, such as ferrous oxide, for oxidation with water so as to produce hydrogen.

While the above described processes provide a suitable method for the production of hydrogen from water, they require the continuous addition of new reactant chemicals other than water and do not recycle all of the product chemicals. It is highly desirable both from the standpoint of pollution and process economy to minimize undesired products and the necessity of continuous addition of new reactants. By the term reactant regenerative closed cycle system we mean a system which minimizes the addition of reactant chemicals other than water and which minimizes reactant products to be removed from the system except the desired gaseous hydrogen and gaseous oxygen.

A four step reactant regenerative closed cycle system is provided utilizing the above general process with direct reduction of ferric chloride by the scheme using hydrogen chloride as follows:

Process Scheme IX $$3FeCl_2 + 4H_2O \rightarrow Fe_3O_4 + 6HCl + H_2 \qquad \text{IX-1}$$

$$Fe_3O_4 + 8HCl \rightarrow 2FeCl_3 + FeCl_2 + 4H_2O \qquad \text{IX-2}$$

$$2FeCl_3 \rightarrow 2FeCl_2 + Cl_2 \qquad \text{IX-3}$$

$$Cl_2 + H_2O \rightarrow 2HCl + 1/2O_2 \qquad \text{IX-4}$$

$$H_2O \rightarrow H_2 + 1/2O_2$$

The equation numbers at the right of the equations correspond throughout this description. The process shown by the above formulas denoted IX-1 to IX-4 is schematically shown in the flow diagram FIG. 3.

Another four step reactant regenerative closed cycle system is provided utilizing the above general process by the process using chlorine as follows:

Process Scheme X $$3FeCl_2 + 4H_2O \rightarrow Fe_3O_4 + 6HCl + H_2 \qquad \text{X-1}$$

$$Fe_3O_4 + 9/2Cl_2 \rightarrow 3FeCl_3 + 2O_2 \qquad \text{X-2}$$

$$3FeCl_3 \rightarrow 3FeCl_2 + 3/2Cl_2 \qquad \text{X-3}$$

$$6HCl + 3/2O_2 \rightarrow 3H_2O + 3Cl_2 \qquad \text{X-4}$$

$$H_2O \rightarrow H_2 + 1/2O_2$$

Figure 4:
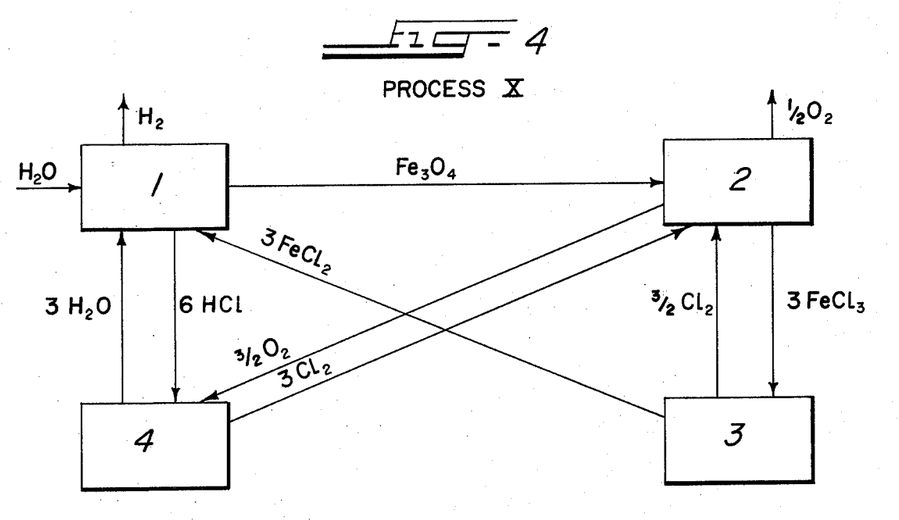
FIG. 4 is a schematic flow diagram of another embodiment of a reactant regenerative closed cycle process of this invention as shown in the generalized schematic flow diagram shown in FIG. 1 utilizing chlorine.

The process shown by the above formulas denoted X-1 to X-4 is schematically shown in the flow diagram of FIG. 4.

A five step reactant regenerative closed cycle system is provided utilizing the above basic process with direct reduction of ferric chloride and further reducing the ferrous compound with hydrogen to metallic iron and then oxidizing the metallic iron with water to produce hydrogen by the scheme using hydrogen chloride as follows:

Process Scheme XI $$3Fe + 4H_2O \rightarrow Fe_3O_4 + 4H_2 \qquad \text{XI-1}$$

$$Fe_3O_4 + 8HCl \rightarrow 2FeCl_3 + FeCl_2 + 4H_2O \qquad \text{XI-2}$$

$$2FeCl_3 \rightarrow 2FeCl_2 + Cl_2 \qquad \text{XI-3}$$

-continued $$3FeCl_2 + 3H_2 \rightarrow 3Fe + 6HCl \quad \text{XI-4}$$

$$Cl_2 + H_2O \rightarrow 2HCl + 1/2 O_2 \quad \text{XI-5}$$

$$H_2O \rightarrow H_2 + 1/2 O_2$$

Figure 5:
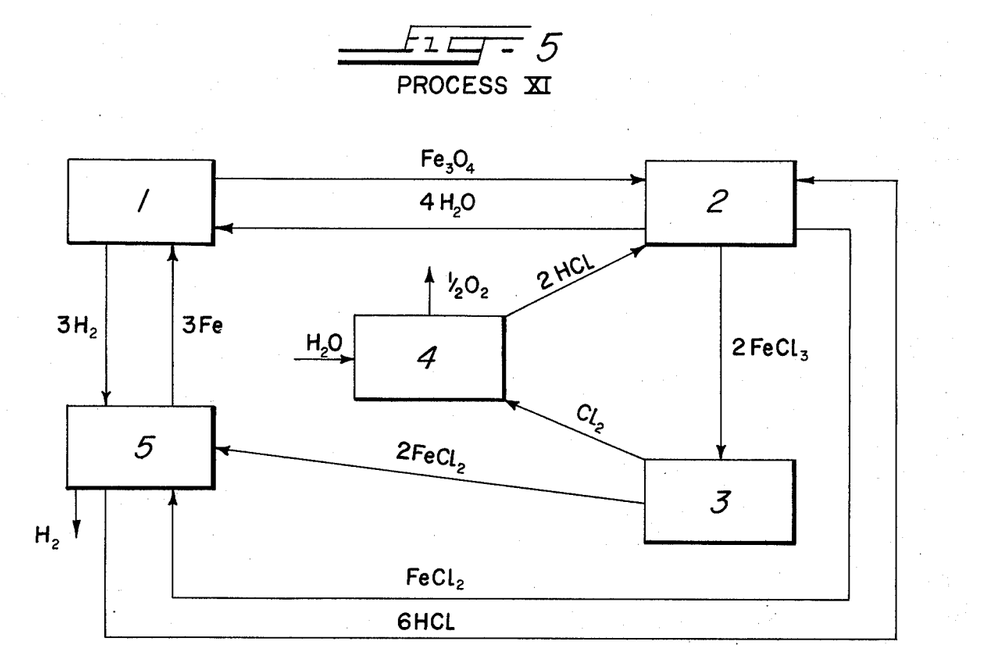
FIG. 5 is a schematic flow diagram of one embodiment of a reactant regenerative closed cycle process according to this invention as shown in the generalized schematic flow diagram shown in FIG. 2 utilizing hydrogen chloride.

The process shown by the above formulas denoted XI-1 to XI-5 is schematically shown in the flow diagram FIG. 5.

A similar five step reactant regenerative closed cycle system is provided utilizing the above general process by the process using chlorine as follows: Process Scheme XII $$3Fe + 4H_2O \rightarrow Fe_3O_4 + 4H_2 \quad \text{XII-1}$$

$$Fe_3O_4 + 9/2 Cl_2 \rightarrow 3FeCl_3 + 2O_2 \quad \text{XII-2}$$

$$3FeCl_3 \rightarrow 3FeCl_2 + 3/2 Cl_2 \quad \text{XII-3}$$

$$3FeCl_2 + 3H_2 \rightarrow 3Fe + 6HCl \quad \text{XII-4}$$

$$6HCl + 3/2 O_2 \rightarrow 3Cl_2 + 3H_2O \quad \text{XII-5}$$

$$H_2O \rightarrow H_2 + 1/2 O_2$$

Figure 6:
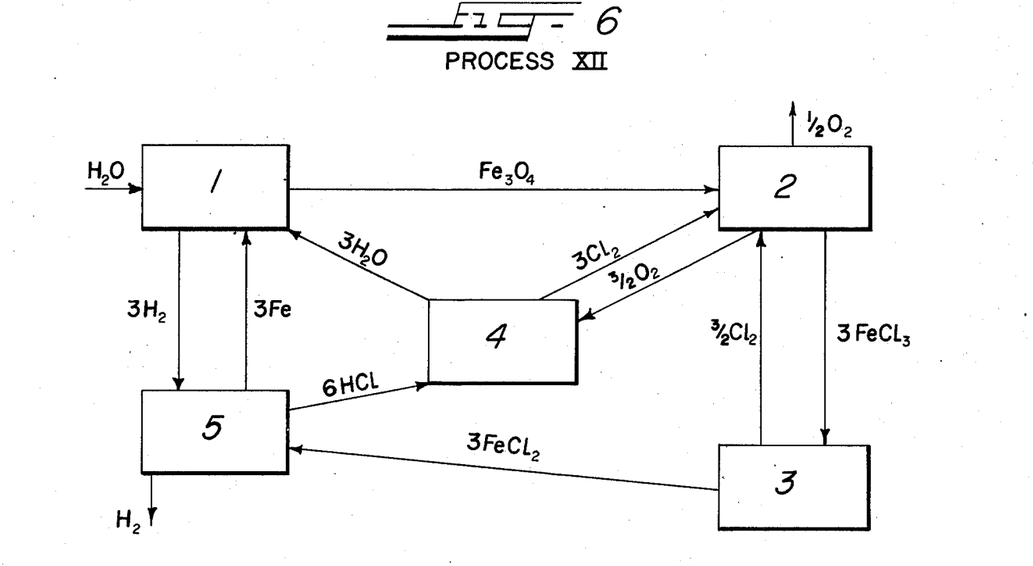
FIG. 6 is a schematic flow diagram of another embodiment of a reactant regenerative closed cycle process of this invention as shown in the generalized schematic flow diagram shown in FIG. 2 utilizing chlorine.

The process shown by the above formulas denoted XII-1 to XII-5 is schematically shown in the flow diagram of FIG. 6.

It is seen in the above process Schemes IX and X the reaction of ferrous chloride to produce hydrogen gas follows the same equations. Equations IX-1 and X-1 are the same. In the Process Schemes XI and XII the oxidation of metallic iron with water to produce hydrogen follows the same chemical equations, that is, Equations XI-1 and XII-1. The reaction of ferriferrous oxide with a chloride ion producing substance is different depending upon the chloride ion producing substance used, Equations IX-2 and XI-2 when hydrogen chloride is used and X-2 and XII-2 when chlorine is used. The reduction of ferric chloride to ferrous chloride directly with heat is the same in Process Schemes IX, X, XI and XII, except as to quantities used, Equations IX-3 and XI-3 when hydrogen chloride is used and the Equations X-3 and XII-3 when chlorine is used. In Process Schemes XI and XII, the ferrous chloride produced according to Equations XI-3 and XII-3 is further reduced with hydrogen to form metallic iron and hydrogen chloride. These reactions are the same in each instance and are set forth as Equations XI-4 and XII-4. The reactions represented by Equations IX-4 and XI-5 are the same and are the reverse, except for quantities, as the reactions represented by Equations X-4 and XII-5. The reaction resulting in the evolution of oxygen gas as noted above, depends upon the chloride ion producing substance used.

The reactions of Equations IX-1 and X-1 can be performed in a flow type reactor where water is continuously passed over solid or molten ferrous chloride. Gaseous hydrogen and hydrogen chloride are evolved and exit in the gas stream leaving solid ferriferrous oxide. The hydrogen and hydrogen chloride may be readily separated by any suitable method such as thermal-cycled physical adsorption columns, such as molecular sieves. The suitable temperature range for Equations IX-1 and X-1 is about 450° to 1500° C. Preferred temperatures are about 600° to about 900° C.

The reactions of Equations IX-2 and XI-2 using hydrogen chloride, and X-2 and XII-2 using chlorine, can be performed in a flow type reactor by passing gaseous hydrogen chloride or chlorine, respectively, over solid ferriferrous oxide. When hydrogen chloride is used solid ferric and ferrous chloride remain and the produced steam exits in the gas steam (Equations IX-2 and XI-2). The reaction of Equations IX-2 and XI-2 may be carried out at about 125° to about 300° C. Preferred temperatures are about 125° to about 250° C. When chlorine is used, gaseous dimer ferric chloride and oxygen exit in the gas stream. Suitable temperatures for the reaction of Equations X-2 and XII-2 are about 800° to about 1000° C. Preferred temperatures are about 875° to about 900° C. At the temperatures used for this reaction the ferric chloride is in the gaseous dimer state, $Fe_2Cl_6$. The $Fe_2Cl_6$ condenses to crystalline $FeCl_3$ at temperatures lower than about 300° C. The dimer has been noticed to exist as a condensing gas at temperatures as low as 200° C. Such crystallization takes place on a cool surface such as the reactor exit chamber.

The reactions of Equations IX-3, X-3, XI-3 and XII-3 represent the direct reduction of ferric chloride with heat. According to the reaction, solid ferric chloride decomposes to ferrous chloride and chlorine at temperatures of about 250° to 325° C. However, in this temperature range, the ferric chloride also sublimes. In the vapor state a stable dimer is formed $Fe_2Cl_6$. The dimer does not readily decompose and therefore, in order to have the reaction to proceed satisfactorily, a vapor pressure of $Fe_2Cl_6$ must be maintained above a bed of solid $FeCl_3$ while the $Cl_2$ produced is removed from the reaction zone.

Figures 7, 7A:
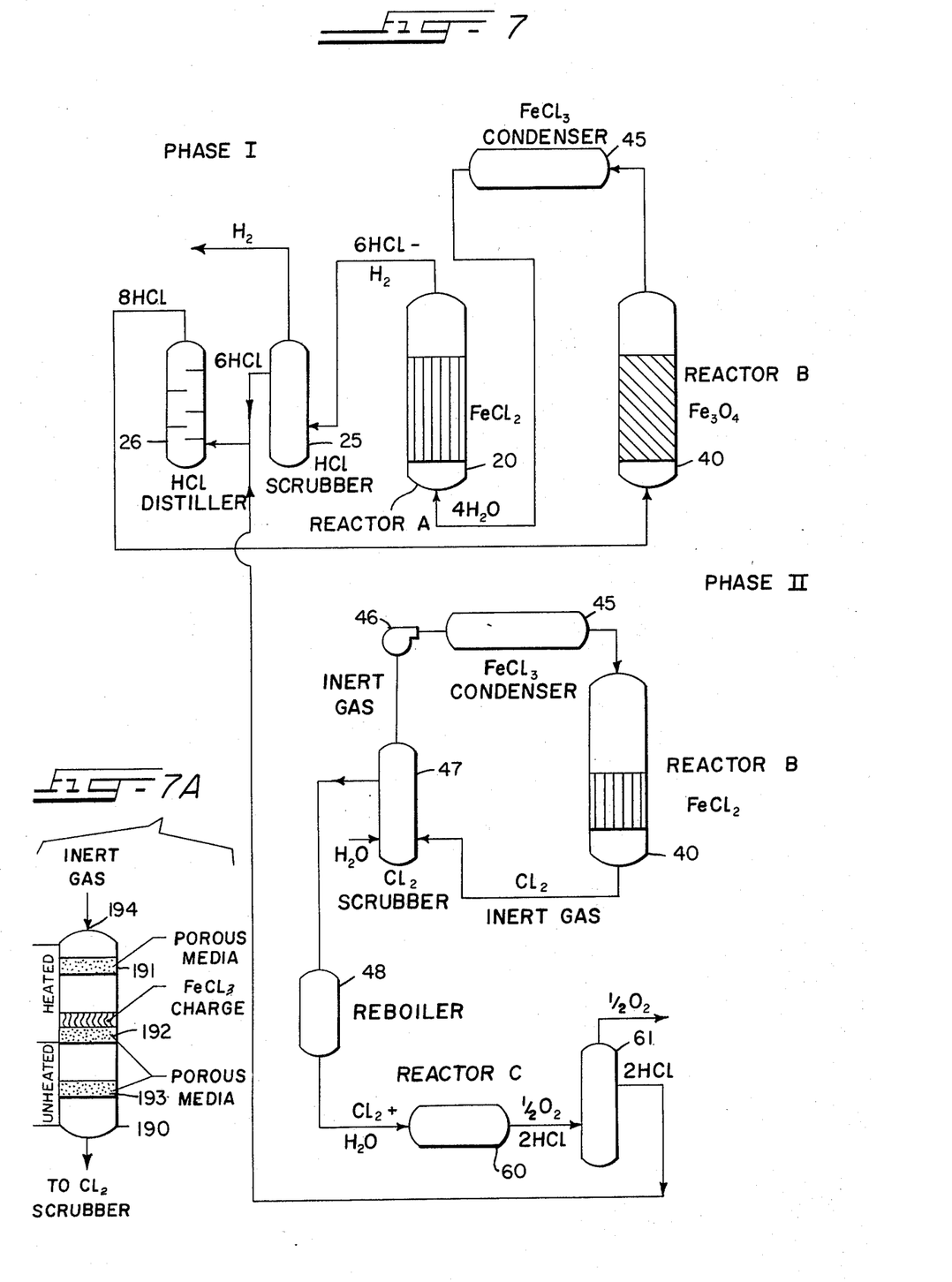
FIG. 7 is a process flow diagram of one embodiment of this invention using hydrogen chloride as the chloride ion source and ferrous chloride in the hydrogen production step.
FIG. 7a shows one embodiment of reactor design for ferric chloride reduction.

As expected from thermodynamic (equilibrium) calculations, solid $FeCl_3$ tends to decompose to a small extent in the temperature range 250° to 325° C. To achieve desired reduction of $FeCl_3$ to $FeCl_2$, the equilibrium of the $FeCl_3 - Fe_2Cl_6 - FeCl_2 - Cl_2$ mixture can be displaced by selective removal of $Cl_2$. By controlling mass transport in a flow reactor and by removing $Cl_2$ from the reaction site, greater than 30% conversions of $FeCl_3$ to $FeCl_2$ can be achieved. FIG. 7a shows a suitable type of reactor module 190 for this conversion. Operating with three or four such modules in series allows virtual completion of the reaction. The reactor has three porous media barriers 191, 192, 193. Examples of suitable materials for the porous media are fritted glass, porous ceramic materials, a sintered metal filter, or a fine, tightly woven felt of webbed fibers.

$FeCl_3$ is charged on the top surface of a porous media 192 in the middle zone of the reactor 190. Inert gas, for example argon or nitrogen, flows downward at a controlled rate. The flow rate, the media porosity, or pressure drop, and the heated zone temperature are important operating parameters. The top half of the reactor 190 is heated to about 250° to 325° C., preferably about 275° to 300° C. The gaseous dimer ($Fe_2Cl_6$) is formed, and the approximate equilibrium vapor pressure develops above the porous media holding the $FeCl_3$ charge. Sublimation of $FeCl_3$ upward through the inert gas inlet 194 is checked by the downward flow of inert gas and also by the porous media 191 at the upper border of the heating zone. The porous media 192 holding the $FeCl_3$ charge retards the flow of the $Fe_2Cl_6$ to the lower half of the reactor. This allows a large portion of the $FeCl_3$ to remain in the heated reaction zone as solid and to decompose to $FeCl_2$ and $Cl_2$, which slowly leave the hot reactor zone with the diluent inert gas downwardly through the middle porous media 192. The $Cl_2$ gas is carried by the inert gas to a $Cl_2$ separator and scrubbed from the gas stream. The $Fe_2Cl_6$ dimer that flows through the middle porous media 192, condenses and crystallizes to $FeCl_3$ on the cold walls of the unheated zone of the reactor 190; some falls on the lower porous media 193. Unreacted $FeCl_3$ is then in the bottom half of the reactor 190.

The conversion is temperature dependent, about 275° to 290° C. is the most preferred temperature range of the heated zone. The unheated zone should be less than about 200° C. in temperature.

If the inert gas flow is too fast or if the porous media is too porous so that it does not retard the gas flow, the desired reaction does not proceed satisfactorily. In this case, the kinetics of the reduction are slower than the reactant loss rate caused by $Fe_2Cl_6$ formation and sublimation away from the reaction zone.

If the inert gas flow is too slow, or if the porous media is not porous enough, the $Cl_2$ product is not driven from the reaction site and the desired reaction progressed very slowly. Also, $Fe_2Cl_6$ leaves the reaction site of its own accord (along with $Cl_2$), and this depletes the $FeCl_3$ reactant.

If the reaction site is much warmer than about 325° C., for example, 425° C., where the desired reaction is calculated to have the most favorable equilibrium the competing reaction, $2FeCl_3 \rightarrow Fe_2Cl_6$, dominates, and very little $FeCl_2$ is formed. If the temperature is too cool, less than about 225° C., all the reaction kinetics are unsatisfactorily slow.

The reactions represented by Equations IX-4 and XI-5, and X-4 and XII-5, are the reverse of each other, respectively, and are gas phase reactions which may be run in a flow reactor. Catalysis is not necessary unless accelerated reaction is desired. Suitable catalysts for the reactions are well known in the art for the Deacon Process. The Deacon Process and suitable catalysts are described more fully in "Recent Developments in the Oxidative Recovery of Chlorine from Hydrochloric Acid," W. F. Engel, M. J. Waale and S. Muller, Chemistry and Industry, Pgs. 67–83, Jan. 13, 1962. The reaction of Equations X-4 and XII-5 is known as the Deacon Process. The reaction of Equations IX-4 and XI-5 is the Reverse Deacon Process, forming gaseous oxygen and gaseous hydrogen chloride which can be readily separated. The reaction of Equations IX-4 and XI-5 can be carried out at above 650° C. with the upper temperature limit governed by the materials of construction. Preferred temperatures are about 750° to about 950° C. The reaction of Equations X-4 and XII-5 forms steam and gaseous chlorine which can be readily separated. The reaction of Equations X-4 and XII-5 can be carried out at about 200° to about 650° C. Preferred temperatures are about 350° to about 650° C.

The reaction of Equations XI-1 and XII-1 is the steam-iron reaction which is a well known industrial process for the oxidation of iron. More complete description of the steam-iron reaction may be found in U.S. Pat. No. 3,442,620. The reaction is carried out by passing water through a bed of high surface area iron in a flow type reactor at temperature of above about 600° C. The upper limit is governed by equipment and economy considerations. Preferred temperature is about 750° to about 1500° C.

While the reactions have been described separately above, it is seen from FIGS. 3, 4, 5 and 6 that the separate reactions can be advantageously combined to form a reactant regenerative closed cycle. When we refer to reaction zones we do not necessarily mean physically separate volumes, but the same physical volume under different conditions such as temperature or pressure may be referred to as different zones. FIGS. 1 through 6 schematically show the processes described wherein the numbered boxes indicate reaction zones and the numbers in the boxes refer to the reactant zone as described herein.

Figure 3:
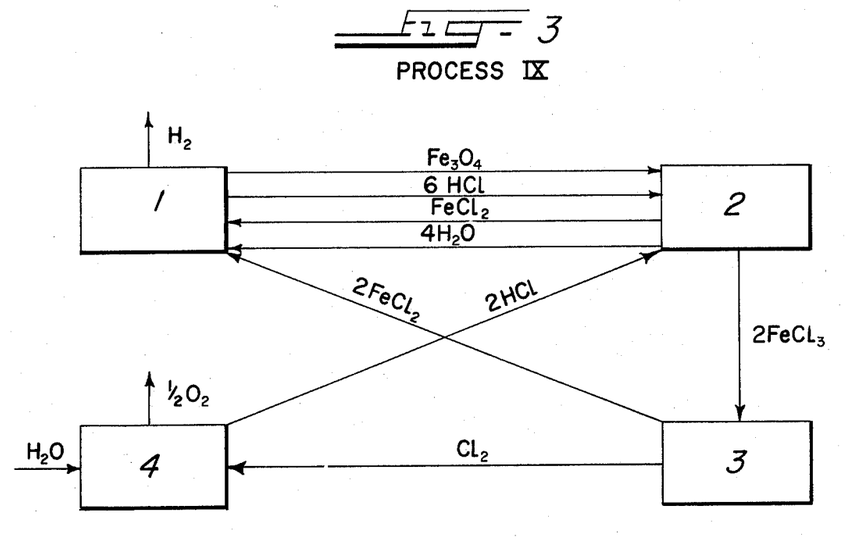
FIG. 3 is a schematic flow diagram of one embodiment of a reactant regenerative closed cycle process according to this invention as shown in the generalized schematic flow diagram shown in FIG. 1 utilizing hydrogen chloride.

One preferred embodiment for production of hydrogen and oxygen from water in a four zone reactant regenerative closed cycle is shown in FIG. 3 by providing water and ferrous chloride to a first reaction zone to produce ferriferrous oxide, hydrogen chloride and hydrogen and removing the hydrogen from the cycle; reacting the ferriferrous oxide and hydrogen chloride in a second reaction zone to produce ferric chloride, ferrous chloride and water, providing the ferrous chloride and the water to the first reaction zone and the ferric chloride to a third reaction zone; thermally reducing the ferric chloride in a third reaction zone to produce ferrous chloride and chlorine, providing the ferrous chloride to the first reaction zone and the chlorine to a fourth reaction zone; and providing water to a fourth reaction zone to produce oxygen and hydrogen chloride, providing the hydrogen chloride to a second reaction zone and removing oxygen from the cycle.

Another preferred embodiment for production of hydrogen and oxygen from water in a four zone reactant regenerative closed cycle is shown in FIG. 4 by providing water and ferrous chloride to a first reaction zone to produce ferriferrous oxide, hydrogen chloride and hydrogen, removing the hydrogen from the cycle and providing the hydrogen chloride to a fourth reaction zone; reacting the ferriferrous oxide and chlorine in a second reaction zone to produce ferric chloride and oxygen, providing at least the stoichiometric oxygen requirement to a fourth reaction zone and removing the remainder of the oxygen from the cycle; thermally reducing the ferric chloride in a third reaction zone to produce ferrous chloride and chlorine, providing the chlorine to the second reaction zone and the ferrous chloride to the first reaction zone; and reacting the hydrogen chloride and oxygen in a fourth reaction zone to produce water and chlorine, providing the water to the first reaction zone and the chlorine to the second reaction zone. While it is necessary to provide the stoichiometric amount of oxygen to the fourth reaction zone, the excess oxygen may be removed from the cycle by removal from the second or fourth reaction zone.

Another preferred embodiment for the production of hydrogen and oxygen from water in a five zone reactant regenerative closed cycle is shown in FIG. 5 by providing water and metallic iron to a first reaction zone to produce ferriferrous oxide and hydrogen, providing at least the stoichiometric requirement of hydrogen to a fifth reaction zone and removing the remainder from the cycle; reacting the ferriferrous oxide and hydrogen chloride in a second reaction zone to produce ferric chloride, ferrous chloride, and water, providing the ferrous chloride to a fifth reaction zone and providing the water formed to the first reaction zone; thermally reducing the ferric chloride in a third reaction zone to produce ferrous chloride and chlorine, providing the ferrous chloride to the fifth reaction zone and the chlorine to a fourth reaction zone; providing water to the fourth reaction zone to produce oxygen and hydrogen chloride, providing the hydrogen chloride to the second reaction zone and removing oxygen from the cycle; and reducing with hydrogen in a fifth reaction zone the ferrous chloride from the second and third reaction zones to produce metallic iron and hydrogen chloride, providing the hydrogen chloride to the second reaction zone, providing the metallic iron to the first reaction zone. While it is necessary to provide the stoichiometric amount of hydrogen to the fifth reaction zone, the excess hydrogen may be removed from the cycle by removal from the first or fifth reaction zone.

Another preferred embodiment of a process for production of hydrogen and oxygen from water in a five zone reactant regenerative closed cycle is shown in FIG. 6 by providing water and metallic iron to a first reaction zone to produce ferriferrous oxide and hydrogen, providing at least the stoichiometric requirement of hydrogen to a fifth reaction zone and removing the remainder from the cycle; reacting the ferriferrous oxide and hydrogen chloride in a second reaction zone to produce ferric chloride and oxygen, providing at least the stoichiometric requirement of oxygen to a fourth reaction zone, removing the remainder from the cycle and providing the ferric chloride to a third reaction zone; thermally reducing the ferric chloride in a third reaction zone to produce ferrous chloride and chlorine, providing the ferrous chloride to the fifth reaction zone and the chlorine to the second reaction zone; reducing with hydrogen in a fifth reaction zone the ferrous chloride from the third reaction zone to produce metallic iron and hydrogen chloride, providing the hydrogen chloride to the fourth reaction zone, providing the metallic iron to the first reaction zone; and reacting the hydrogen chloride and oxygen in the fourth reaction zone to produce water and chlorine, providing the water to the first reaction zone and the chlorine to the second reaction zone. While it is necessary to provide the stoichiometric amount of hydrogen to the fifth and oxygent to the fourth reaction zone, the excess hydrogen may be removed from the cycle by removal from the first or fifth reaction zone and the excess oxygen from the second or fourth reaction zone.

A preferred specific embodiment of this invention is set forth above denoted as Process Schemes IX and X. FIG. 7 shows a suitable process flow diagram utilizing the regenerative closed cycle process schemes denoted as IX and X. The process uses a series of sets of similar reactors and process cycles operated in parallel but out of phase with respect to process steps. The number of sets or parallel process cycles depends upon the reaction kinetics and is chosen to best match the process energy transfer requirements. Such operation allows for an optimum heat transfer pattern and good overall efficiency. For sake of clarity one set of reactors is used to describe the process.

In FIG. 7, Phase 1 shows reactor 20(A) and reactor 40(B) where the reactions of Equations IX-1 and IX-2 are carried out. Reactor 20(A) has a packed bed of ferrous chloride. Water is passed through the bed where the reaction of Equation IX-1 occurs at a temperature of about 800° C. The solids are converted to ferriferrous oxide and the gaseous reaction products, hydrogen chloride and hydrogen, exit from the top of the reactor. The gases are separated in a hydrogen chloride scrubber 25, the hydrochloric acid concentrated by distillation in HCl distiller 26 and hydrogen chloride transferred to reactor 40(B). Hydrogen gas is removed from the system by removal from HCl Scrubber 25 following the separation. The hydrogen may be further purified or used directly as required. Alternatively, not shown in FIG. 7, the hydrogen chloride and hydrogen could be separated by physical adsorption of the hydrogen chloride, hydrogen not being adsorbed. Thermal cycling of the adsorption apparatus would then provide the separated hydrogen chloride for use in reactor 40(B). In this case, no liquid phases are involved and no distillation occurs.

In Phase I, reactor 40(B) contains a packed bed of ferriferrous oxide. After the reaction of Equation IX-1 has been completed in reactor 20(A) the solid product composition remaining in reactor 20(A) is the same as that of reactor 40(B) before the reaction of Equation IX-2. The hydrogen chloride is passed through reactor 40(B) maintained at about 225° C. where the reaction of Equation IX-2 takes place. The ferrous chloride product is non-volatile and will remain in the reactor bed. The water and some of the volatile ferric chloride leaves reactor 40(B) and passes through a condenser 45 which collects the ferric chloride. The water is then recycled for utilization in reactor 20(A).

Phase II includes the reaction of Equation IX-3 and is performed in the apparatus shown in FIG. 7 as Phase 2 wherein reactor 40(B) is the same as reactor 40(B) in Phase I and in the condition after reaction of Equation IX-2 has occurred. Inert gas, such as helium or nitrogen, is passed through the ferric chloride condenser 45 wherein the ferric chloride sublimes from the condenser 45 and is recycled to reactor 40(B) where the reaction shown by Equation IX-3 takes place at a temperature of about 280° C. The inert gas is then recirculated in a closed cycle by blower 46. The volumetric flow rate of inert gas can be small, just enough to give flow direction to the subliming ferric chloride. The gas leaving reactor 40(B) consists of inert gas and chlorine.

The inert gas and chlorine gas leaving reactor 40(B) in Phase II are separated in a scrubbing column 47 or by physical adsorption equipment. It scrubbing is used, water is added to the system in the scrubbing column. The chlorine-water mixture is passed from the scrubbing column through a reboiler 48, vaporized and passed through reactor 60(C) where the reaction shown by Equation IX-4 takes place at 800° C. The hydrogen chloride and oxygen products of reactor 60(C) are passed through a scrubber 61 and the hydrogen chloride separated and returned to the cycle of Phase I. The oxygen product from the scrubber 61 is removed from the cycle for storage or for direct use as oxygen in another chemical process. Alternatively, not shown in FIG. 7, oxygen and hydrogen chloride may be separated by physical adsorption.

It is noted from FIG. 7, as in all of the cycles of process schemes of this invention, that there is no transport of solids necessary in the process, all of the material transport from one reaction site to another occurring by the gaseous phase. This feature is important to obtain a high energy efficiencies.

Figure 8:
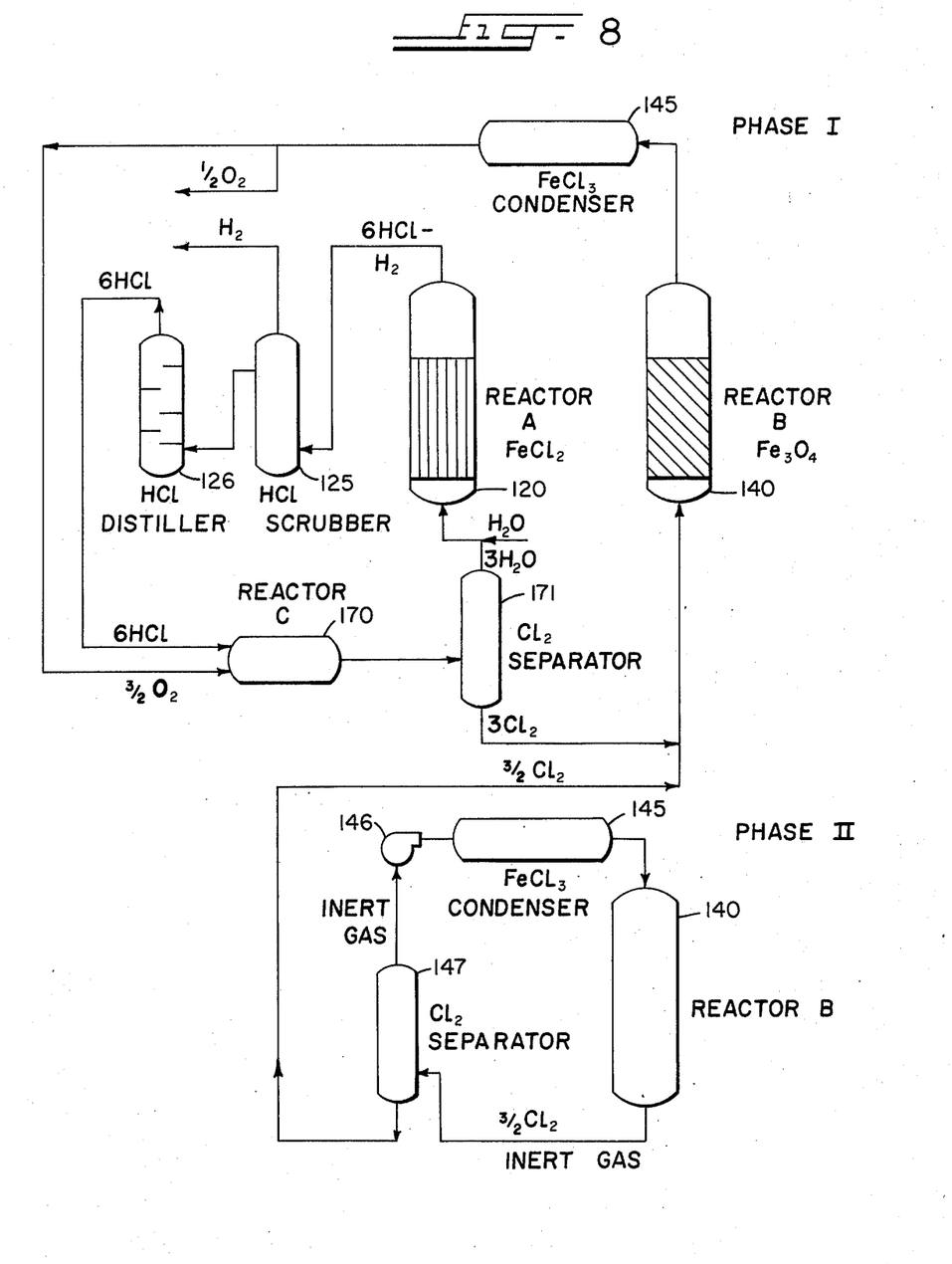
FIG. 8 is a process flow diagram of one embodiment of this invention using chlorine as the chloride ion source and ferrous chloride in the hydrogen production step.

In FIG. 8, Phase 1 shows reactor 120(A) and reactor 140(B) where the reactions of Equations X-1 and X-2 are carried out. Reactor 120(A) has a packed bed of ferrous chloride. Water is passed through the bed where the reaction of Equation X-1 occurs at a temperature of about 800° C. The solids are converted to ferriferrous oxide and hydrogen, exit from the top of the reactor 120. The gases are separated in a hydrogen chloride scrubber 125, the hydrogen chloride concentrated by distillation in HCR distiller 126 and transferred to reactor 170(C). Hydrogen gas is removed from the system at HCl scrubber 125 following the separation. The hydrogen may be further purified or used directly as required. The hydrogen chloride and hydrogen may also be separated by physical adsorption as previously described.

In Phase I, reactor 140(B) contains a packed bed of ferriferrous oxide. After the reaction of Equation X-1 has been completed in reactor 120(A) the solid product composition remaining in reactor 120(A) is the same as that of reactor 140(B) before the reaction of Equation X-2. Chlorine gas is passed through reactor 140(B) maintained at about 925° C. where the reaction of Equation X-2 takes place. The oxygen and the volatile ferric chloride leave reactor 140(B) and pass through a condenser 145 which collects the ferric chloride. Part of the oxygen produced is removed from the process, the remainder goes to reactor 170(C) where reaction X-4 takes place. An optional method would be to pass all of the oxygen to reactor 170(C) and remove the unreacted oxygen from the process there.

The hydrogen chloride from reactor 120(A) and part of the oxygen from reactor 140(B) are passed through reactor 170(C) at 325° C. where the reaction of Equation X-4 takes place. The chlorine and water products are then separated in $Cl_2$ separator 171 sending the water to reactor 120(A) and the chlorine to reactor 140(B).

Phase 2 includes the reaction of Equation X-3 and is performed in the apparatus shown in FIG. 8 as Phase II wherein reactor 140(B) is the same as reactor 140(B) in Phase I and in the condition after reaction of Equation X-2 has occurred. Inert gas, such as helium or nitrogen, is passed through the ferric chloride condenser 145 and is recycled to reactor 140(B) where the reaction shown by Equation X-3 takes place at a temperature of about 280° C. The inert gas is then recirculated by blower 146 in a closed cycle. The volumetric flow rate of inert gas can be small, just enough to give flow direction to the subliming ferric chloride. The gas leaving reactor 140(B) consists of inert gas and chlorine.

The inert gas and chlorine gas leaving reactor 140(B) in Phase II is separated in a scrubbing column 147 or by physical adsorption equipment. The chlorine is then passed to reactor 140(B) in Phase I.

Figure 9:
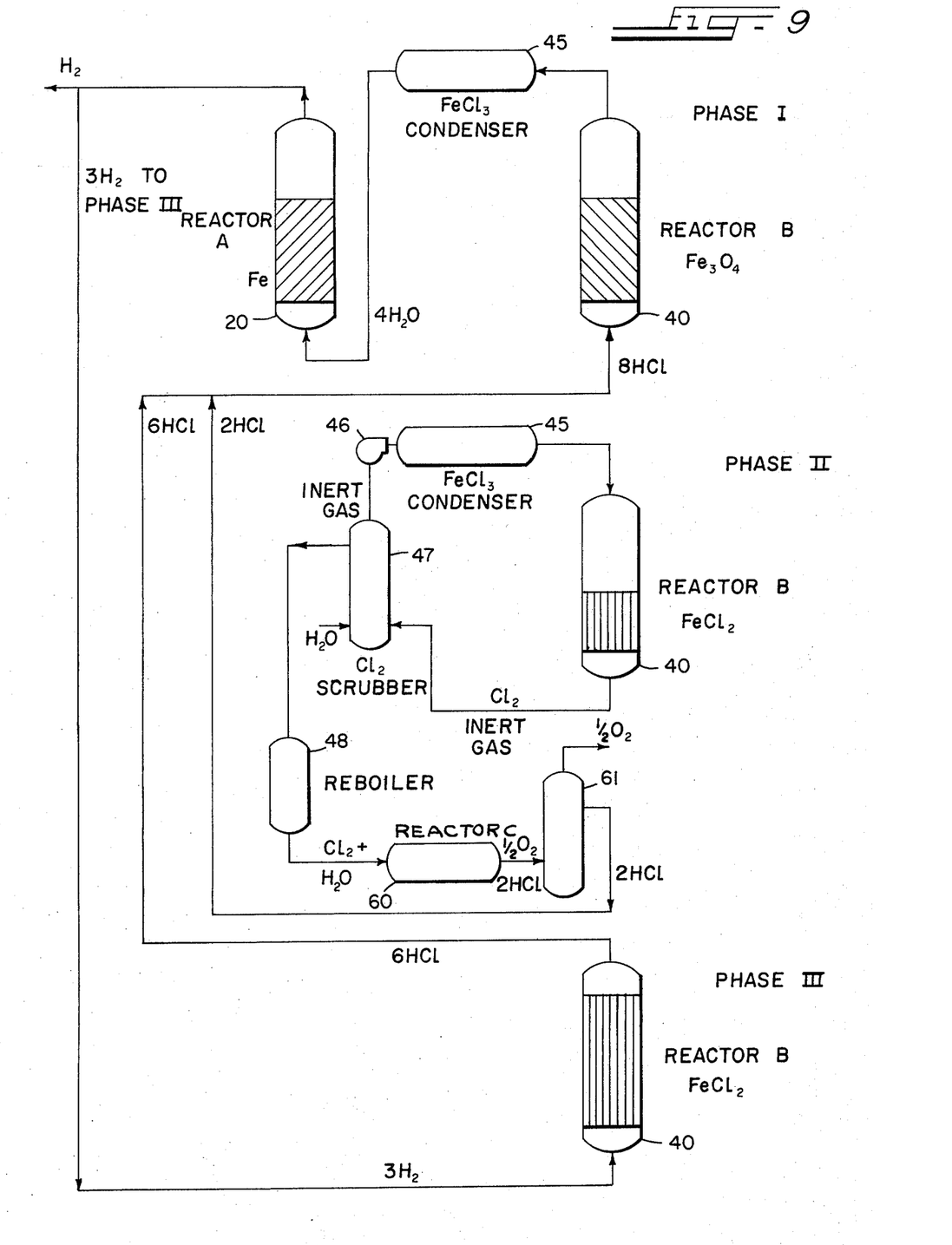
FIG. 9 is a process flow diagram of one embodiment of this invention using hydrogen chloride as the chloride ion source and metallic iron in the hydrogen production step.
Figure 10:
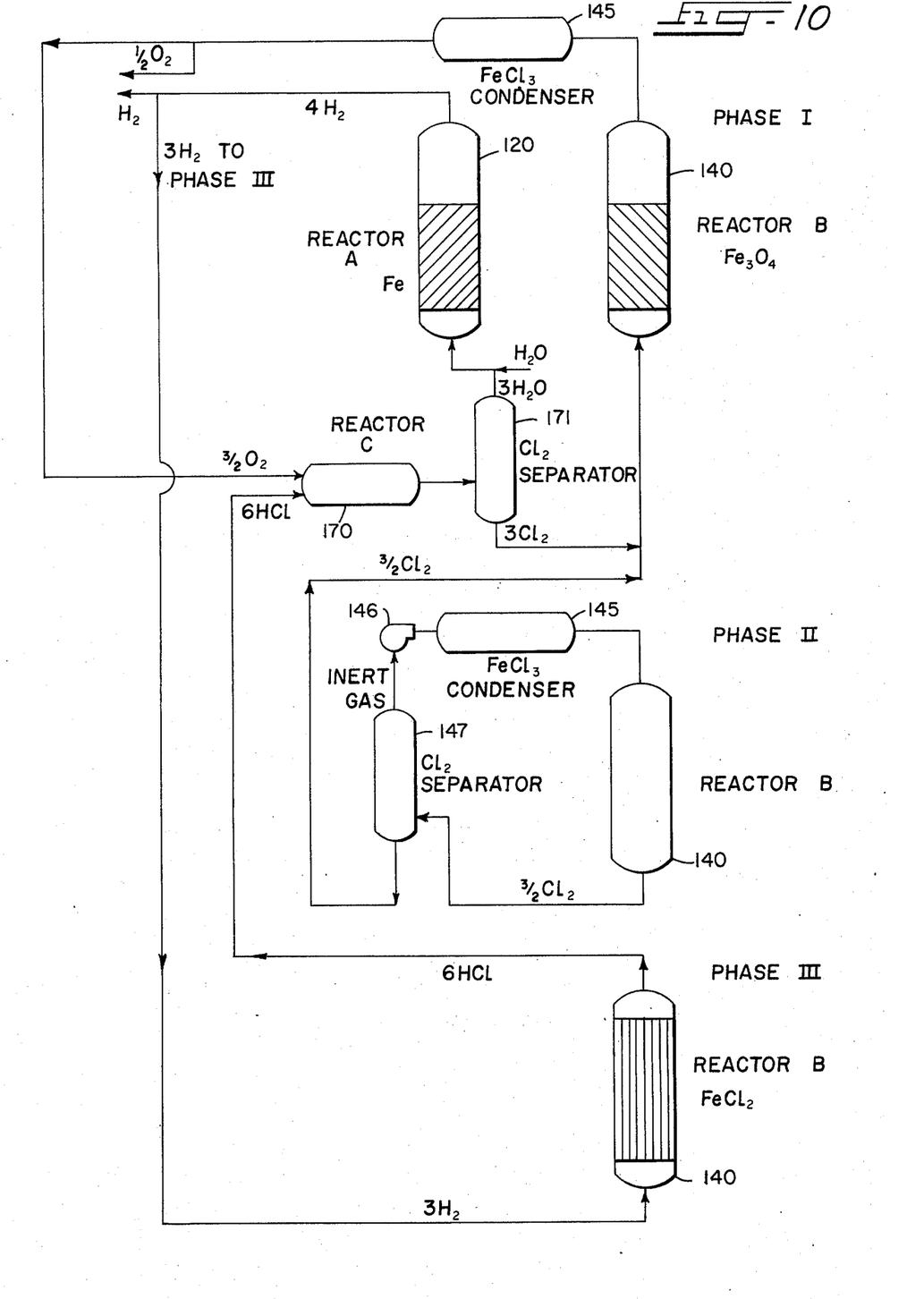
FIG. 10 is a process flow diagram of one embodiment of this invention using chlorine as the chloride ion source and metallic iron in the hydrogen production step.

FIGS. 9 and 10 show the processes described by the reaction sequence XI-1 through XI-5 and XII-1 through XII-5. The description of the process shown in FIG. 9 is similar to that process shown in FIG. 7 with a few exceptions. In Phase I, reactor 20(A) is initially a bed of metallic iron instead of ferrous chloride. The only gaseous product is hydrogen, some of which is removed from the process, the rest is passed to Phase 3 reactor 40(B). Reactor 40(B) is fed with hydrogen chloride from phase II and Phase III. Phase II remains identical including the end product in reactor 40(B) being ferrous chloride. Because the composition of this reactor must be identical to that in reactor 20(A) of Phase I, a third phase (Phase III) is required. In this phase the ferrous chloride in reactor 40(B) is reduced with hydrogen from Phase I to metallic iron as described in the reaction of Equation XI-4 at 900° C. The hydrogen chloride product is passed to Phase I reactor 40(B).

FIG. 10 is also similar to FIG. 8. In Phase I, reactor 120(A) is initially a bed of metallic iron instead of ferrous chloride. The only gaseous product is hydrogen, some of which is removed from the process, the rest is passed to Phase III, reactor 140(B). Reactor 140(B) is the same as presented in FIG. 8. Reactor 170(C) is fed with hydrogen chloride from Phase 3 reactor 140(B). Phase II remains identical including the end product in reactor 140(B) being ferrous chloride. Because the composition of this reactor must be identical to that in reactor 120(A) of Phase I, a third phase (Phase III) is required. In this phase the ferrous chloride in reactor 140(B) is reduced with hydrogen from Phase I to metallic iron as described in the reaction of Equation XII-4 at 900° C. The hydrogen chloride product is passed to Phase 1, reactor 170(C).

The energy efficiency of the process as shown in FIG. 3 and in Process Scheme IX has been calculated to be 47 percent. The calculation can be summarized by the total heat input to the cycle per mole of hydrogen produced due to the ideal heat requirement of all endothermic reactions and material streams, which is +263 kcal; and due to the ideal heat available from all exothermic reactions and material streams, which is −195 kcal; and due to the additional heat required because of process step temperature levels which necessarily produce waste heat; which is +49 kcal; and due to step work requirements for which further additional heat is needed, which is +29 kcal. Thus, the total process heat requirement is +146 kcal per mole of hydrogen produced. The theoretical heating value of hydrogen per mole is 68.3 kcal. Thus, the energy efficiency is expressed as $$\text{Energy Efficiency} = \frac{\text{Heat Output (or Heating Value per mole } H_2)}{\text{Heat to process + Heat required for work}}$$

and is computed to be 47 percent for the cycle shown in FIG. 3.

The energy efficiency of the process as shown in FIG. 4 and in Process Scheme X has been calculated to be 35 percent. The calculation can be summarized by the total heat input to the cycle per mole of hydrogen produced due to the ideal heat requirement of all endothermic reactions and material streams, which is +251 kcal; and due to the ideal heat available from all exothermic reactions and material streams, which is −183 kcal; and due to the additional heat required because of process step temperature levels which necessarily produce waste heat, which is +88 kcal; and due to step work requirements for which further additional heat is needed, which is +39 kcal. Thus, the total process heat requirement is +196 kcal per mole of hydrogen produced. The theoretical heating value of hydrogen per mole is 68.3 kcal. Thus, the energy efficiency is expressed as $$\text{Energy Efficiency} = \frac{\text{Heat Output (or Heating Value per mole } H_2)}{\text{Heat to process + Heat required for work}}$$

and is computed to be 35 percent for the cycle shown in FIG. 4.

The energy efficiency of the process as shown in FIG. 5 and in Process Scheme XI has been calculated to be 40 percent. The calculation can be summarized by the total heat input to the cycle per mole of hydrogen produced due to the ideal heat requirement of all endothermic reactions and material streams, which is +281 kcal; and due to the ideal heat available from all exothermic reactions and material streams, which is −213 kcal; and due to the additional heat required because of process step temperature levels which necessarily produce waste heat, which is +49 kcal; and due to step work requirements for which further additional heat is needed, which is +54 kcal. Thus, the total process heat requirement is +170 kcal per mole of hydrogen produced. The theoretical heating value of hydrogen per mole is 68.3 kcal. Thus, the energy efficiency is expressed as $$\text{Energy Efficiency} = \frac{\text{Heat Output (or Heating Value per mole } H_2)}{\text{Heat to process + Heat required for work}}$$

and is computed to be 40 percent for the cycle shown in FIG. 5.

The energy efficiency of the process as shown in FIG. 6 and in Process Scheme XII has been calculated to be 30 percent. The calculation can be summarized by the total heat input to the cycle per mole of hydrogen produced due to the ideal heat requirement of all endothermic reactions and material streams, which is +291 kcal; and due to the ideal heat available from all exothermic reactions and material streams, which is −222 kcal; and due to the additional heat required because of process step temperature levels which necessarily produce waste heat, which is +113 kcal; and due to step work requirements for which further additional heat is needed, which is +45 kcal. Thus, the total process heat requirement is +226 kcal per mole of hydrogen produced. The theoretical heating value of hydrogen per mole is 68.3 kcal. Thus, the energy efficiency is expressed as $$\text{Energy Efficiency} = \frac{\text{Heat Output (or Heating Value per mole } H_2)}{\text{Heat to process + Heat required for work}}$$

and is computed to be 30 percent for the cycle shown in FIG. 6.

All of the processes of this invention can be carried out at low pressures. Pressures of about 0.5 to about 5 atmospheres are suitable. Pressures of about 1 atmosphere are preferred.

Reactors and process equipment can be of suitable material as will be obvious to one skilled in the art. For example, glass and ceramic lined reactors are suitable.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for the production of hydrogen and oxygen from water in a four zone reactant regenerative closed cycle wherein all material transport from one reaction site to another occurs in the gaseous phase comprising the steps:

reacting steam and ferrous chloride in a first reaction zone at temperatures of about 450° to about 1500° C. to produce ferriferrous oxide, hydrogen chloride and hydrogen and removing the hydrogen from the cycle;

reacting solid ferriferrous oxide and hydrogen chloride in a second reaction zone at temperatures of about 125° to about 300° C. to produce ferric chloride, ferrous chloride and steam, providing the ferrous chloride and the steam to the first reaction zone and the ferric chloride to a third reaction zone;

thermally reducing ferric chloride in a third reaction zone at temperatures of about 225° to about 325° C. to produce ferrous chloride and chlorine, said chlorine product being removed from the reaction zone while maintaining a vapor pressure of dimer $Fe_2Cl_6$ in the zone of a solid ferric chloride reactant and providing the ferrous chloride to the first reaction zone and the chlorine to a fourth reaction zone; and providing water to a fourth reaction zone and reacting with chlorine at temperatures above about 650° C. to produce oxygen and hydrogen chloride, providing the hydrogen chloride to a second reaction zone and removing oxygen from the cycle.

2. The process of claim 1 wherein said thermal reduction is carried out at a temperature of about 275° to 290° C.

3. The process of claim 1 wherein the reaction of ferriferrous oxide and hydrogen chloride is carried out at a temperature of about 125° to about 250° C.

4. The process of claim 1 wherein the ferrous chloride is reacted with steam at a temperature of about 600° to about 900° C.

5. The process of claim 1 wherein steam and chlorine are reacted at a temperature of about 750° to about 950° C.

6. The process of claim 1 wherein molten ferrous chloride is reacted with steam.

7. The process of claim 1 wherein said thermal reduction is carried out in a reactor having porous media barrier, said solid ferric chloride being charged on one side of said porous media, maintaining the portion of the reactor containing the solid ferric chloride at about 250° to 325° C. and maintaining the portion of the reactor on the other side of said porous media at below about 200° C; and flowing an inert gas through the ferric chloride at the porous media, said inert gas carrying through the media gaseous $Fe_2Cl_6$ dimer and chlorine.

8. The process of claim 7 wherein said chlorine is removed from the inert gas stream by scrubbing.

9. The process of claim 7 wherein said chlorine is removed from the inert gas stream by physical adsorption.

10. The process of claim 7 wherein up to four of said reactors having porous media barrier are used in series.

11. The process of claim 7 wherein said porous media is selected from the group consisting of fritted glass, porous ceramic materials, sintered metal and fine, tightly woven felt of webbed fibers.

12. The process of claim 1 wherein said $Fe_2Cl_6$ dimer which leaves the thermal reducing zone is condensed and crystallized to $FeCl_3$ at temperatures of less than about 200° C.

* * * * *